May 9, 1939.　　　　　G. SPATTA　　　　　2,157,680
WELD TRIMMING APPARATUS
Original Filed Nov. 23, 1936　　2 Sheets-Sheet 1
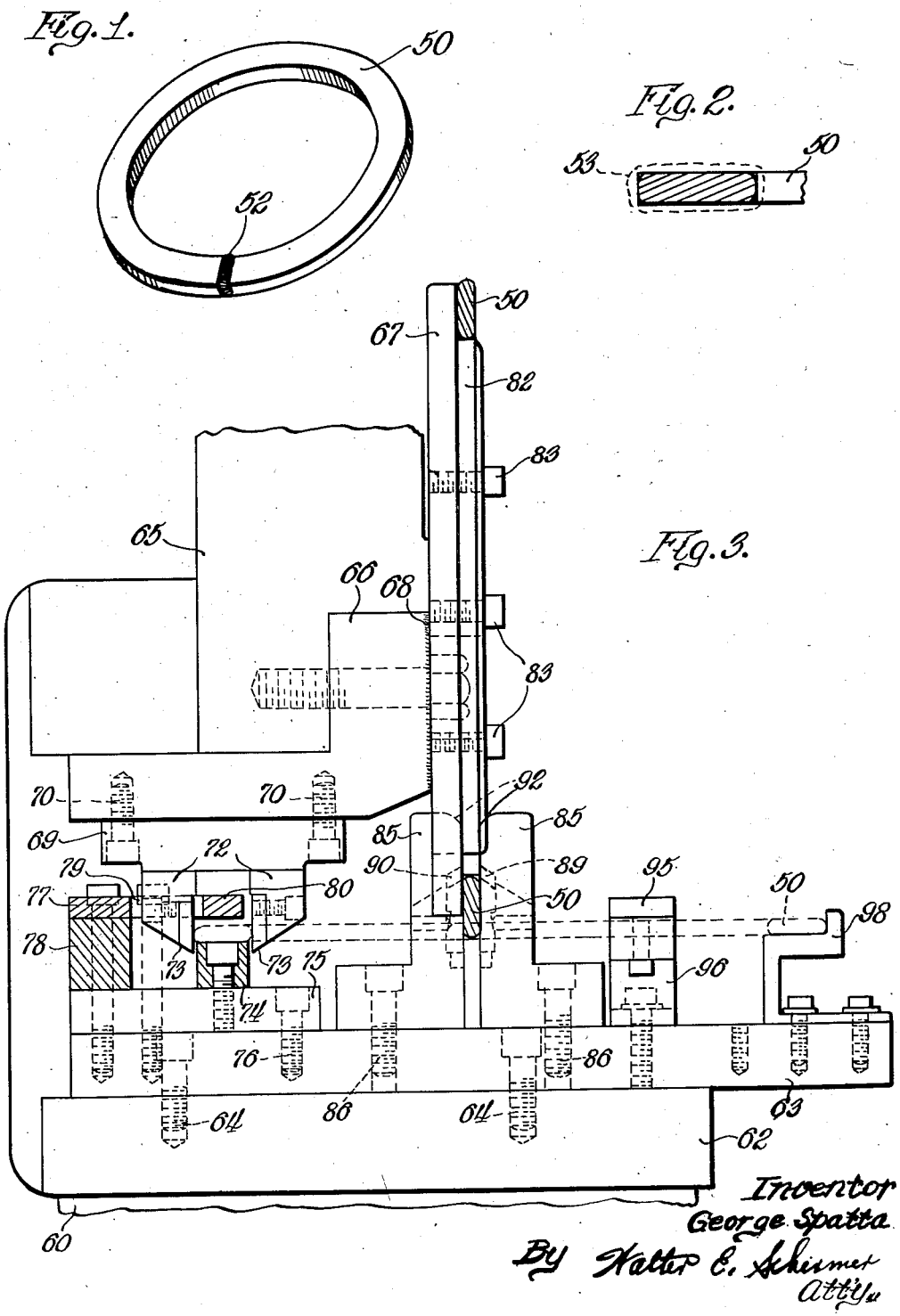

May 9, 1939. G. SPATTA 2,157,680

WELD TRIMMING APPARATUS

Original Filed Nov. 23, 1936 2 Sheets-Sheet 2

Inventor
George Spatta
By Walter E. Schirmer
Atty

Patented May 9, 1939

2,157,680

UNITED STATES PATENT OFFICE 2,157,680

WELD TRIMMING APPARATUS

George Spatta, Buchanan, Mich., assignor to Clark Equipment Company, Buchanan, Mich., a corporation of Michigan Original application November 23, 1936, Serial No. 112,247. Divided and this application September 3, 1937, Serial No. 162,297

8 Claims. (Cl. 90—43)

This invention relates to apparatus employed in the forming of reinforcing rings, and more particularly is directed to such apparatus for trimming the welded junction of reinforcing rings formed as disclosed in my copending application, Serial No. 112,247, filed November 23, 1936, of which the present application is a division.

It has been found necessary in the fabrication of rear axle housings of the banjo type to reinforce the banjo frame flanges by flat ring members or the like in order to provide adequate support for the differential carrier assembly, and such reinforcing rings are ordinarily placed in position about the banjo frame opening and welded securely to the flange by both external and internal welds. This is disclosed more in detail in my copending application, Serial No. 147,655, filed June 11, 1937.

The present invention is particularly directed to a trimming apparatus which will trim the welded junctions of rings formed, as disclosed in my first-mentioned copending application.

As disclosed in said parent application, a piece of strip stock of rectangular cross-section and convenient length is first passed edgewise through suitable rolling apparatus to form a tightly wound helix having a number of coils. This coil is then placed in suitable position and cut radially at one side to provide a number of split rings which have their ends laterally displaced. The rings are then flash welded at their adjacent ends to produce continuous ring members, the weld being then trimmed in the apparatus disclosed herein. After the trimming operation, the rings are sized and straightened prior to their application to the banjo flanges.

One object of the present invention resides in the manner in which the rings are trimmed after welding so as to leave no projections which would interfere with the placing of the ring in flat position on the banjo flange. This also insures that the rings can be accurately sized and shaped after the trimming operation.

Another feature of the present invention resides in providing a trimming apparatus, which can be easily set up to accommodate different sizes of rings and which can be adjusted to produce any desired trimming of the welded junction.

Still another feature of the present invention is the provision of trimming apparatus having means thereon, whereby the ring can be accurately positioned for the trimming operation, and the two operations of trimming the weld both radially and laterally can be carried on with a minimum of effort by an unskilled operator.

Other objects and advantages of the present invention will appear more fully from the following detailed description which, taken in conjunction with the accompanying drawings will disclose to those skilled in the art, the particular construction and operation of a preferred form of the present invention.

In the drawings:

Figure 1 is a perspective view of a ring member after the ends thereof have been welded;

Figure 2 is a sectional view through the ring adjacent the weld;

Figure 3 is a side elevational view of the ring trimming mechanism; and

Figure 4:
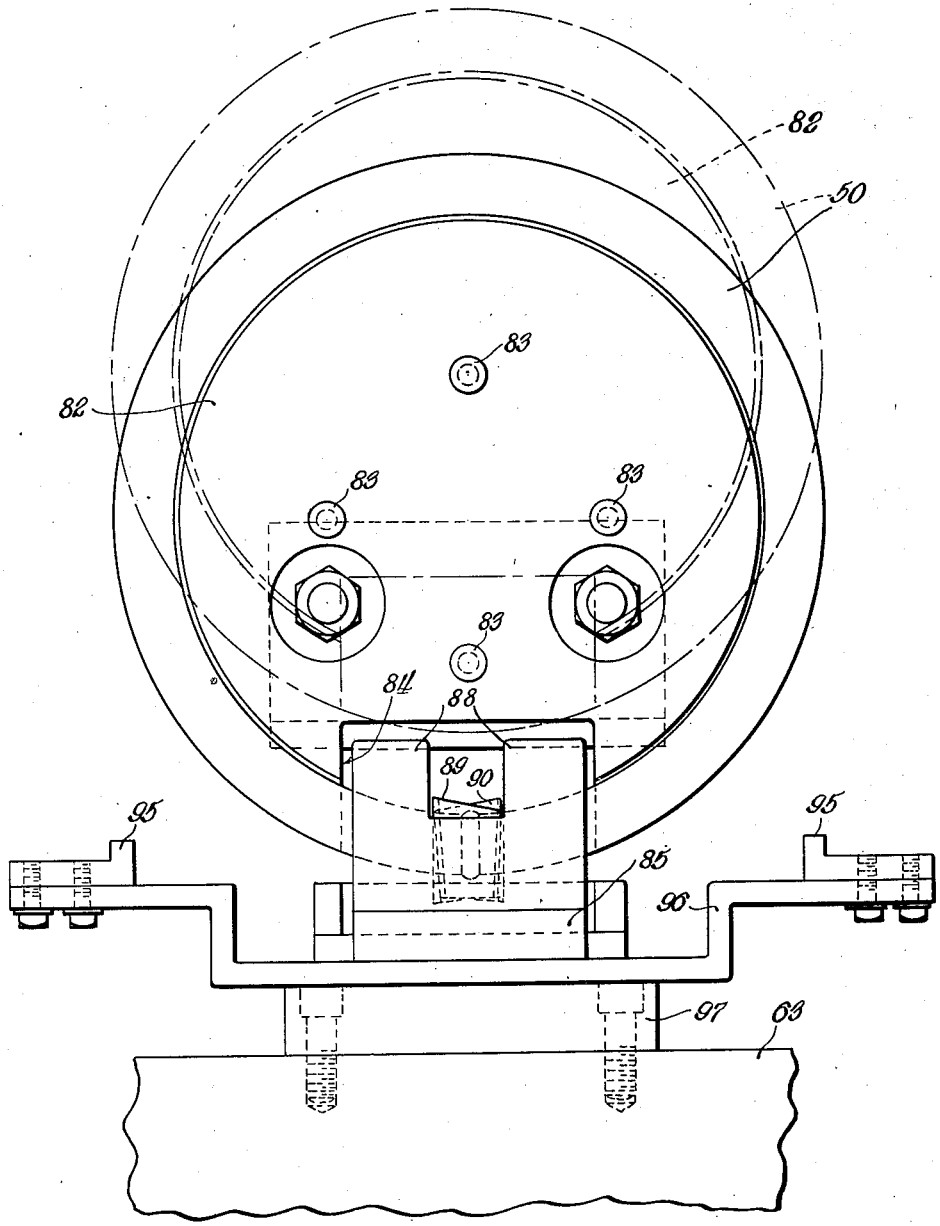
Figure 4 is a front elevational view of the machine shown in Figure 3.

After the helical coil has been formed from the flat stock and has been cut to form the plurality of individual ring members, the ends of each of these ring members are welded by flash welding, or in any other suitable manner. The cutting operation produces a plurality of the ring members which are of split form and have the ends thereof spaced apart a distance corresponding to the width of the saw cut. The adjacent ends of these rings, such as the ring 50 shown in Figure 1, are then welded as indicated at 52. This welding operation produces a flash at the adjacent ends indicated by the dotted line 53 in Figure 2, which would materially interfere with the mounting of this ring on the banjo flange due to the fact that it would space the ring from the surface of the flange. Also, the radial flash at the inner and outer peripheries would interfere with the mounting of the differential carrier on the housing, and also would affect the smooth appearance of the banjo frame.

For these reasons, I have found it necessary to trim this flash in order to provide a uniform ring having smooth surfaces, which can be placed in coplanar contact with the banjo flange and can be readily welded thereto. The trimming mechanism for producing this result is shown in Figures 3 and 4.

This mechanism comprises a stand or pedestal 60 having a top facing support 62 upon which is mounted the base plate 63 by means of a plurality of cap screws 64. Supported for reciprocation at the upper end of the stand 60 is a power head 65 which may be actuated for vertical reciprocation by any suitable means, such as a hydraulic piston, gear means or electrical mechanism.

The head 65 has a punch holder 66 carried thereby to which is welded a face plate 67, as indicated at 68. At its lower surface, the punch holder 66 carries a block 69 secured thereto by the cap screws 70, which in turn supports a pair of depending punches 72 provided with shear blades 73 spaced apart a distance substantially equal to the width of the reinforcing ring.

A ring pad 74 is mounted between the shear blades 73 on a supporting plate 75 secured to the base plate 63 by the screws 76 and a stripping plate 77 mounted on the block 78 which is also secured to the supporting plate 75. The plate 77 has an apertured portion 79 receiving the rear punch 72 and has a cross portion 80 disposed above the ring pad 74 for the purpose of stripping the ring from the shear blades when the power head 65 is raised.

Removably secured to the face plate 67 is a pilot plate 82 which is of a diameter substantially equal to the inner diameter of the ring 50. This pilot is secured to the plate 67 by the cap screws 83 extending therethrough substantially centrally of the plate, and can be demounted for the substitution of various sizes of pilot plates, depending upon the size of the ring being trimmed. Adjacent the lower portion of the face plate, there is provided a recess 84 which extends also through the face plate 67 in order to provide for clearance for the plate 67 and the pilot plate with respect to a pair of shear blade holders 85. These holders are substantially L-shaped and are secured to the base plate 63 by the cap screws 86. They provide vertically extending laterally spaced arm portions 88 between which are disposed shear blades 89 and 90, respectively, which extend in opposite angular directions as indicated in Figure 4, and serve to shear off the flash on the lateral faces of the ring 50 as the ring is carried downwardly by the pilot 82. The holders 85 are spaced apart a distance such as to permit entry of the ring 50 therebetween, this entrance being facilitated by the rounded portion 92 at the upper ends of the arms 88.

In order to center the ring 50 in position for shearing by the punches 72, suitable adjustable gauges 95 are mounted upon the ends of the gauge bracket 96 secured at its center to the supporting block 97 mounted on the plate 63. The gauges 95 are spaced apart a distance corresponding to a chord across the internal diameter of the ring 50, while a third gauge member 98 is mounted on the outer end of the plate 63 to receive the portion of the ring 50 opposite the weld 52. Thus when the ring 50 is placed in the dotted line position shown in Figure 3, it is automatically centered with respect to the punch by means of the gauges 95 and 98 so that the welded portion 52 thereof is disposed over the ring pad 74 in position to be engaged by the shear blades 73 carried by the punch holders 72.

In the operation of this mechanism, the ring 50 is first placed about the pilot 82 and the head 64 is then lowered by hydraulic pressure or the like. This forces the lower end of the ring between the brackets or holders 85, and allows the shear blades 89 and 90 to shear away the extraneous welding material on the lateral faces of the ring. As the pressure head 65 is raised, the ring 50 is removed from the pilot 82 and placed in horizontal position as determined by the gauges 95 and 98. The head is then again lowered, and the blades 73 shear off any remaining extraneous material from the outer and inner edges of the ring, thus forming the ring with planar sides and smooth circular inner and outer peripheries.

It is believed obvious that by adjustable mounting of the gauges 95 and 98 and the removable character of the pilot plate 82, rings of any desired size may be trimmed in this mechanism with facility. Also, the machine is simple in design and operation and is capable of rapid operation for securing the desired speed of trimming commensurate with mass production and economy.

While I have illustrated and described a preferred form of the present invention, it is to be understood, of course, that various changes may be made in the details of the structure without departing from the fundamental principles involved. I therefore do not intend to be limited except as defined by the scope and spirit of the appended claims.

I claim:

1. In a machine for trimming the weld between adjacent ends of a split ring, a frame, a power head reciprocatory with respect thereto, pilot means on said frame supporting said ring in horizontal position, a stripper plate on said frame overhanging the welded face of said ring, and shearing means on said head for trimming the weld on opposite edges of said ring, said stripper plate holding said ring in position as said head moves upwardly after a shearing operation.

2. In a machine for trimming the weld between adjacent ends of a split ring, a frame, a power head reciprocatory with respect thereto, pilot means on a vertical face of said head supporting said ring in a vertical position thereon, a pair of shearing members on said frame in alinement with opposite faces of said ring when so supported, means for lowering said head to move said ring between said members, and means in said head accommodating said movement of said ring.

3. A machine for trimming the weld of a butt end welded flat ring comprising a frame, means on said frame for supporting said ring in a horizontal plane thereon with the weld positioned on a ring pad, a stripper plate above said ring and having punch-receiving openings, a power head reciprocatory vertically on said frame and having a pair of depending punches, and means for lowering said head to shear off the radial projections of said ring weld as the punches move through said openings on opposite sides of said ring pad.

4. A machine for trimming the weld of a butt end welded flat ring comprising a frame, a pair of blade holders mounted thereon, blades in said holders directed upwardly and spaced apart a distance equal to the axial thickness of said ring, a power head, means on said head for supporting the ring thereon in a vertical plane alined with said blades, a recess in said means whereby the lower end of said ring may pass between said blades, and means for raising and lowering said head.

5. In a machine for trimming the weld between adjacent ends of a split ring, a frame and a vertically movable power head, means supporting said ring in vertical position on said head including a portion cut away adjacent the lower portion of the ring, and cutter means on said frame for receiving said ring upon downward movement of said head and trimming away any portions of said weld projecting from the lateral surfaces of said ring, said cut-away portion allowing full movement of said ring past said cutter means.

6. In a machine for trimming the weld between adjacent ends of a split ring, a frame, a power head reciprocatory with respect thereto, pilot means on said frame supporting said ring in a plane normal to movement of said head, stripper means on said frame in alinement with the welded face of the ring, and shearing means on the head for trimming the weld on opposite edges of the ring, said stripper means holding said ring in position as said head moves away from the ring after a shearing operation.

7. In a machine for trimming the weld between the adjacent ends of a split ring, a frame, a power head reciprocatory with respect thereto, pilot means for supporting said ring on said head in a plane parallel to the direction of movement thereof, a pair of shearing members on said frame in alinement with opposite faces of the ring when so supported, and means in said head accommodating movement of said head relative to said shearing members to pass said ring therebetween.

8. In a machine for trimming the weld between adjacent edges of a split ring, a frame member, a power head member reciprocatory with respect to said frame member, pilot means on one of said members for supporting said ring against movement relative thereto, and cutter means rigidly secured in position on the other of said members and spaced apart a distance such as to cut the flash from opposite surfaces of said ring upon relative movement of said members.

GEORGE SPATTA.